J. W. BATES.

Binding Attachment for Harvesters.

No. 89,194.

Patented April 20, 1869.

UNITED STATES PATENT OFFICE.

J. W. BATES, OF ST. PAUL, MINNESOTA.

IMPROVEMENT IN BINDING ATTACHMENTS FOR HARVESTERS.

Specification forming part of Letters Patent No. 89,194, dated April 20, 1869.

*To all whom it may concern:*

Be it known that I, JOSEPH W. BATES, of St. Paul, in the county of Ramsey and in the State of Minnesota, have invented certain new and useful Improvements in Harvesters; and do hereby declare that the following is a full, clear, and exact description thereof, reference being had to the accompanying drawings and to the letters of reference marked thereon.

The nature of my invention consists in the construction and general arrangement of the platform and table attached to a harvester for the purpose of binding grain.

In order to enable others skilled in the art to which my invention appertains to make and use the same, I will now proceed to describe its construction and operation, referring to the annexed drawings, which form a part of this specification, and in which—

Figure 1:
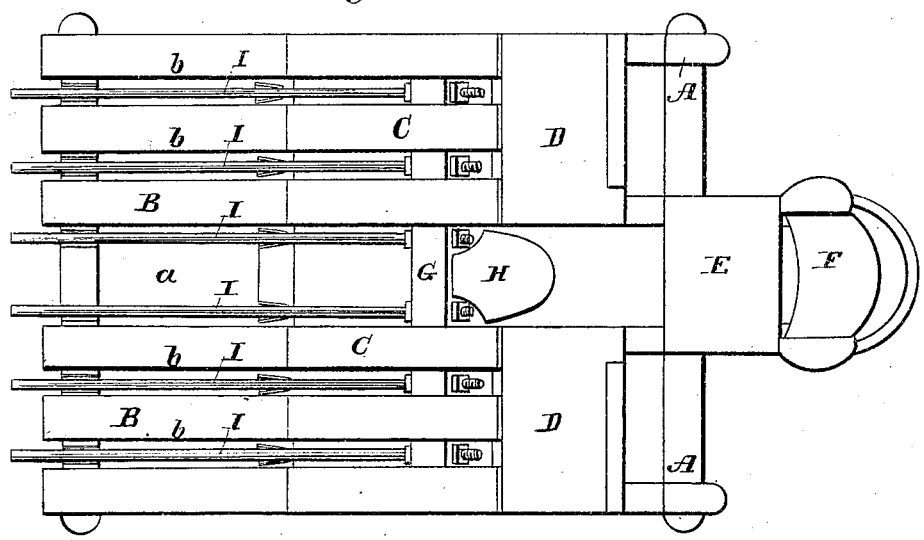
Figure 2:
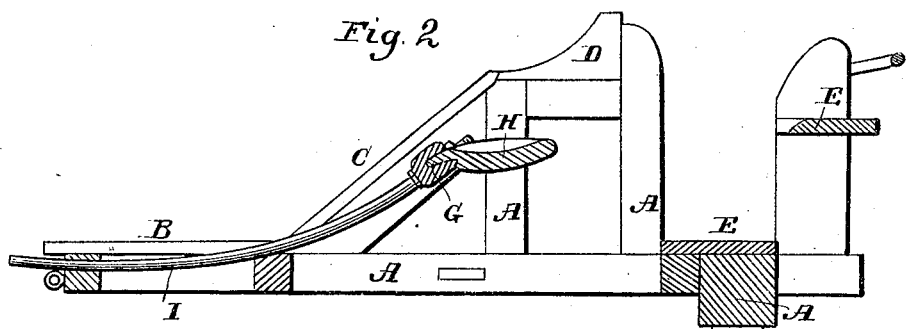

Figure 1 is a plan view, and Fig. 2 a longitudinal vertical section.

A represents the frame of my machine, at the front end of which the platform B is placed. This platform is provided with one wide slot, *a*, across the center, and a series of narrow slots, *b b*, on each side of the center slot. From the rear end of the platform B an inclined plane, C, leads up to the front end of the binding-table D. Both the inclined plane C and the binding-table D are slotted across the center to correspond with the center slot *a* in the platform. The inclined plane C has in addition a series of narrower slots to correspond with the slots *b b* in the platform. The binding-table D is of concave shape, as shown in Fig. 2. In rear of the table D is a platform, E, and seat F for the binder. Under the inclined plane C, and in the frame A, is placed a shaft or axle, G, which is provided with a series of bent teeth, I I, passing along the slots in the inclined plane and platform, extending a suitable distance in front of the front edge of said platform. The shaft G is also provided with a tripper, H, extending toward the operator's seat F, so that he may at any time trip the rake formed of the shaft G and teeth I I carrying the sheaf up from the platform B to the binding-table D. Under the rear portion of the frame A a wheel, J, is placed. This machine can be attached to any reaper and harvester desired by placing the front end of the platform B close to the reaper-platform, at that point where the reaper's rake throws the grain off its own platform. The binder then trips the rake carrying the grain up the inclined plane onto the binding-table, the rake at once descending again ready for the next sheaf from the reaper. The binding-table D being slotted through the center, the binder can easily pass his hand around the grain and tie it without losing a single straw. This table is particularly designed to be used in connection with my tie patented October 20, 1868.

Some harvesters are so constructed that the inclined plane C will have to extend from the front end of the table upward instead of downward, the grain then falling down the inclined plane onto the binding-table, which may be flat as well as concave; but in all cases slotted, as above described.

There are many farmers who do not use harvesters, and in that case I mount my machine on a pair of light wheels, the head of the rake forming the axle-tree for the same. The rake-teeth are then made in suitable shape to go under the swath.

Having thus fully described my invention, what I claim as new, and desire to secure by Letters Patent, is—

1. The combination of the slotted binding-table D, slotted inclined plane C, and slotted platform B, all constructed and arranged substantially as and for the purposes herein set forth.

2. The arrangement, with table D, inclined plane C, and platform B, of the shaft G, teeth I, tripper H, and seat F, all constructed and operating substantially as herein set forth.

In testimony that I claim the foregoing I have hereunto set my hand this 9th day of January, 1869.

J. W. BATES.

Witnesses:
　DAVID SANFORD,
　HARRY HILL.